3,677,974
MULTI-PURPOSE CONDUCTIVE ADHESIVE

Timothy J. Kilduff, Greenbelt, Md., assignor to the United States of America as represented by the Secretary of the Army
No Drawing. Continuation of abandoned application Ser. No. 739,632, June 25, 1968. This application Sept. 18, 1970, Ser. No. 73,666
Int. Cl. H01b 1/02; B01f 17/42
U.S. Cl. 252—514      6 Claims

ABSTRACT OF THE DISCLOSURE

A multi-purpose electrically conductive adhesive consisting of a novolak-epoxy resin, particulate silver and an imidazole cures at moderate temperatures to form an adhesive bond resistant to temperatures in the range 150–200° C.

---

This application is a continuation of Ser. No. 739,632 filed June 25, 1968, now abandoned.

The invention described herein may be used by or for the Government of the United States for governmental purposes without the payment of any royalties thereon to me.

This invention relates to an electrically-conductive adhesive composition.

There is a particular need for an electrically-conductive adhesive composition stable at 150–200° C. for use in electronic devices having components that cannot withstand cure temperatures above about 65–70° C. It is generally accepted that in order to produce an adhesive bond stable at an elevated temperature, the adhesive must be previously cured at that temperature. Thus, most conventional electrically-conductive adhesives designed to withstand elevated temperatures contain a hardener such as dicyandiamide or a carboxylic acid anhydride and have a cure temperature of about 150° C. Electrically-conductive adhesives capable of cure at moderate temperatures are generally available as a two-part system based on a metal-resin mixture wherein the curing agent is added just prior to use. Such systems require the careful weighing of rather small amounts of highly active curing agents, have a very short working life after addition of the curing agent and generally do not produce adhesive bonds particularly resistant to elevated temperatures.

It is a principal object of the present invention to provide an electrically-conductive adhesive able to withstand temperatures of 150–200° C. but capable of cure at moderate temperatures. It is a further object of the invention to provide such an adhesive as a storable one-part composition. These and further objectives and advantages of the present invention will become apparent on consideration of the discussion and examples which follow:

The electrically-conductive adhesive of the present invention is a mixture comprising 25–35 parts of a novolak-epoxy resin, 65–75 parts of particulate silver, and 0.5–1.4 parts all by weight of an imidazole curing agent.

The compositions of the present invention are prepared by adding 65–75 parts of finely divided silver particles or flakes to 25–35 parts of a novolak-epoxy resin, i.e., a phenolformaldehyde glycidyl ether. Such resins are commercially available under the names Epon 152, D.E.N. 431 and EPN–1139, and have a WPE (weight per epoxide) in the range 172–179 and a viscosity in the range of 14–20 poises at 52° C. In one embodiment, the resin is warmed to about 50° C. to reduce its viscosity and the warm resin and silver particles are stirred until a uniform mixture is obtained. Then, 0.5–1.4 parts of an imidazole curing agent such as 2,4-ethylmethylimidazole, 1-methylimidazole or 1-benzyl-2-methylimidazole is quickly added. The warm ingredients are thoroughly mixed and the mixture immediately cooled to inhibit premature curing.

In alternate embodiment, instead of heating, the viscosity of the resin is reduced by the addition of a small portion of a solvent such as acetone. The silver flake and the imidazole curing agent can then be incorporated at room temperature. This method is preferred when a solid imidazole such as imidazole itself is to be added. The elimination of heating has the further advantage of avoiding the possibility of premature curing. After the ingredients have been thoroughly blended, the solvent is removed under vacuum.

The adhesive composition is conveniently packaged in the form of individual packets containing predetermined amounts of adhesive. For example, one to two gram portions of the adhesive mixture are dispensed into previously vacuum-formed pockets in a plastic sheet such as of polyethylene. A second sheet of plastic is placed over and heat sealed to the first sheet, and the resultant packets are stored under refrigeration. Tests made on such compositions in storage up to 12 months showed no change in the mechanical strength or electrically resistance of the resultant adhesive bond as a consequence of storage. As required, individual packets are separated from the sheet and opened; the adhesive is ready for use without the necessity for further weighing or mixing. This form of packaging is particularly suitable for use in the field by relatively unskilled personnel. The packets can be transported without refrigeration if the temperature is moderate (below about 70° F.) and the shipping time is restricted to several days duration.

The adhesive compositions of the present invention have been applied as a coating to porous materials such as glass cloth or perforated plastic film to form a dry conductive tape. The composite thermosets on application of heat and pressure. Conductive laminates can be prepared by heat-curing stacked sheets of adhesive containing materials while under pressure.

An adhesive composition according to the present invention containing 30 parts of resin, 70 parts of silver flake 0.5 to 2.0 microns in size, and 0.6 part of 2-ethyl-4-methylimidazole was evaluated by measuring electrical resistance across the bond line in a brass test specimen with a Kelvin resistance bridge and by measuring bond strength of the specimen with an Instron tester (ASTM–D2095). When test measurements were made at elevated temperatures, the bonded samples were brought to test temperature, usually 150° C., in 3–4 minutes by means of a hot air heater. The typical resistance for bonded articles was 0.00045 ohm through an 0.005 inch glue line, with an average bond strength over 3000 p.s.i. Adhered specimens cured at 65° C. had an average bond strength of 1500 p.s.i. at 150° C. and demonstrated a change in resistance of only 0.00003 ohm. With a cure time of about 4 hours at 65° C., the bond was capable of withstanding a temperature of 200° C.; however, the resultant bond strength was about 800–900 p.s.i.

The adhesive composition of the present invention is designated multi-purpose since it can be used as a low temperature as well as a high temperature adhesive. For example, the adhesive can be cured at room temperature for 1 to 2 weeks to form a bond stable to about 70° C. Or, depending on the heat resistance of nearby components, the adhesive can be cured at temperatures up to about 150° C. to form progressively stronger bonds.

It is significant to note that the adhesive composition of the present invention is specific in its ambit. For example, the substitution of copper powder for particulate silver will not yield an adequate electrically-conductive adhesive as discussed hereinabove.

I claim as my invention:

1. The method of preparing packages of conductive adhesive by the steps of:
   (A) forming a mixture consisting of 65 to 75 parts of finely divided silver particles and 25 to 35 parts of a novolak-epoxy resin;
   (B) adding to this mixture .5 to 1.4 parts of an imidazole curing agent taken from the group consisting of 2,4 - ethylmethylimidazole, 1 - methylimidazole, 1-benzyl-2-methylimidazole at a temperature below the curing temperature;
   (C) providing containers capable of holding the quantity of material equivalent to that normally required by a single usage;
   (D) filling the packages with the requisite amount of the mixture at a temperature below the curing temperature;
   (E) sealing the packages; and
   (F) storing the packages at a temperature sufficiently below the curing temperature to prevent curing until the adhesive is required for use.

2. The method of claim 1 in which the mixing is performed by:
   (A) providing 65 to 75 parts of finely divided silver particles;
   (B) providing 25 to 35 parts of a phenolformaldehyde glycidyl ether;
   (C) warming the phenolformaldehyde glycidyl ether to a temperature about 50 degrees centigrade to reduce its viscosity;
   (D) adding the silver particles to the warm phenolformaldehyde glycidyl ether; and
   (E) stirring the mixture of warm phenolformaldehyde glycidyl ether and silver particles until a uniform mixture is obtained.

3. The method of claim 1 in which the mixing is performed by:
   (A) providing the desired quantity of novolak-epoxy resin;
   (B) decreasing the viscosity of the novolak-epoxy resin by adding a solvent thereto;
   (C) adding the silver material and the imidazole curing agent to the thinned resin; and
   (D) stirring the mixture until a uniform mixture is obtained.

4. The package of conductive adhesive formed by the process of claim 1.

5. The method of claim 1 in which the silver material is in the size range of from 0.5 to 2.0 microns.

6. A unitary package of pre-measured portions of uncured conductive adhesive comprising a first plastic sheet which has been vacuum formed to obtain a plurality of depressions each capable of holding a premixed, preweighed portion of the uncured adhesive, an uncured portion of adhesive in each of said depressions, said adhesive consisting essentially of 25 to 35 parts of a phenolformaldehyde glycidyl ether, 65–75 parts finely divided silver particles and 0.5–1.4 parts of an imidizole curing agent taken from the group consisting of 2,4-ethylmethylimidazole, 1-methylimidazole, 1 - benzyl-2-methylimidazole; and a cover sheet of plastic which has been heat sealed to said first plastic sheet in a manner to prevent curing of the encapsulated uncured conductive adhesive.

References Cited

UNITED STATES PATENTS

| | | | |
|---|---|---|---|
| 2,774,747 | 12/1956 | Wolfson et al. | 252—514 |
| 3,356,645 | 12/1967 | Warren | 260—47 |
| 2,795,680 | 6/1957 | Peck | 252—511 |
| 3,412,043 | 11/1968 | Gilliland | 252—514 |

DOUGLAS J. DRUMMOND, Primary Examiner

U.S. Cl. X.R.

260—37 EP